(12) United States Patent
Thiriat

(10) Patent No.: US 6,341,554 B2
(45) Date of Patent: Jan. 29, 2002

(54) TOASTER HAVING TRANSPARENT HEATING WALLS

(75) Inventor: Sylvain Thiriat, Cleurie (FR)

(73) Assignee: .SEB S.A., Ecully (FR)

( * ) Notice: Subject to any disclaimer, the term of this patent is extended or adjusted under 35 U.S.C. 154(b) by 0 days.

(21) Appl. No.: 09/785,527

(22) Filed: Feb. 20, 2001

(30) Foreign Application Priority Data

Feb. 18, 2000 (FR) .............................................. 00 02058

(51) Int. Cl.[7] .................................................. A47J 37/08
(52) U.S. Cl. .............................. 99/327; 99/331; 99/385; 99/389; 219/492; 219/543; 219/521; 338/308
(58) Field of Search ........................... 99/326–331, 385, 99/389–391, 401, 400; 65/60.51; 106/286.4, 286.6; 219/521, 492, 543, 544; 338/308; 359/360, 580; 427/314, 419.3, 110; 252/519.5

(56) References Cited

U.S. PATENT DOCUMENTS

| | | | | |
|---|---|---|---|---|
| 1,893,989 A | * | 1/1933 | Galer | 99/390 X |
| 1,926,276 A | * | 9/1933 | Forbes | 99/332 |
| 1,967,209 A | * | 7/1934 | Lawrence | 99/327 |
| 1,979,845 A | * | 11/1934 | Schallis | 99/332 |
| 2,564,677 A | | 8/1951 | Davis | |
| 2,631,523 A | * | 3/1953 | Olving | 99/331 X |
| 2,764,081 A | * | 9/1956 | Glasser | 99/390 X |
| 3,524,404 A | | 8/1970 | Kimura | |
| 4,345,513 A | * | 8/1982 | Holt | 99/401 X |
| 5,528,980 A | * | 6/1996 | McClean | 99/389 |
| 5,642,657 A | * | 7/1997 | Yeung et al. | 99/393 X |
| 5,802,957 A | * | 9/1998 | Wanat et al. | 219/521 X |

FOREIGN PATENT DOCUMENTS

| | | |
|---|---|---|
| DE | 3047780 A1 | 12/1980 |
| DE | G 91 15 161.9 | 12/1991 |
| DE | G 93 16 913.2 | 11/1993 |
| FR | 2 731 311 | 3/1995 |
| FR | 2 759 842 | 2/1997 |
| FR | 2 763 233 | 5/1997 |

* cited by examiner

*Primary Examiner*—Timothy F. Simone
(74) *Attorney, Agent, or Firm*—Browdy and Neimark

(57) ABSTRACT

A toaster having a base and at least two substantially vertical heating elements defining a cooking space that is open at least at the upper part of the toaster, the heating elements being in the form of transparent glass walls composed of a glass substrate covered, on one of its faces, with a layer of metal oxide or oxides, the layer being connected to an electric supply circuit for supplying heating current. At least two of the glass walls have an upper rim, or lip, the rim or lip being made of a transparent material.

13 Claims, 4 Drawing Sheets

TOASTER HAVING TRANSPARENT HEATING WALLS

BACKGROUND OF THE INVENTION

The present invention relates to the technical field of household electric cooking appliances of the toaster type and concerns more particularly an appliance whose heating elements are constituted by transparent walls.

U.S. Pat. No. 2,564,677 discloses a toaster whose heating elements are transparent walls, such as glass plates, covered with a metal oxide layer having a base of tin and indium oxide, subsequently commonly called ITO (for "Indium Tin Oxide"). This layer, whose thickness is between 0.3 µm and 0.7 µm, is transparent and resistive, so that when connected to an electric power supply, it is heated to a temperature needed to toast a bread slice or slices placed between the walls. Such elements can thus be utilized in order to control the toasting process while allowing direct observation of the degree of browning of the bread.

Devices permitting the reheating of rolls and similar food items are also known, this reheating function being performed with the aid of an additional removable accessory, which comes to be positioned above the opening of the toasting chamber as described in the patent document DE G 9115161.9, or with the aid of an accessory that is integrated into the toaster, but can be moved out of the way when it is not needed.

Patent document DE G 9316913.2 describes a toaster having a reheating means composed of two rigid metal wires that can open out in rotation around an axis in a manner to form a support disposed at a distance above the toaster.

Although such a system offers acceptable results, the mechanism for rotating the wires can deteriorate or sag under the weight of the food to be reheated. In addition, such a device requires additional parts, notably for rotation of the wires, which increases the price at which the toaster can be sold.

Moreover, this device is not compatible with, or adaptable to, a form of construction that allows viewing the bread that is being subjected to the action of the heating elements.

BRIEF SUMMARY OF THE INVENTION

An object of the present invention is to overcome the problems presented by the prior art, without providing a removable accessory for reheating rolls, which accessory is often difficult to put away and can be lost, while assuring the most complete observation possible of the bread that is being toasted or reheated.

The present invention provides a toaster having a base and at least two substantially vertical heating elements defining a cooking, or toasting, space that is open at least at the upper part of the toaster. The heating elements are in the form of transparent glass walls each composed of a glass substrate covered, on one of its faces, with a resistive layer of metal oxide or oxide. The metal oxide layer is connected to an electric supply circuit that supplies heating current and at least two of the glass walls each have an upper rim, or lip, made of a transparent material.

Such a rim or lip is intended to be a part of the upper edge of the wall or of a piece connected at this level which projects laterally to form a border portion. With this configuration, the reheating of rolls and pastries is correctly assured, while permitting a visual observation thereof, in order to avoid particularly an undue browning while the rims remain in esthetic harmony with the transparent glass walls. Moreover, this principle avoids the need for a removable device that is difficult to store and capable of being lost. In addition, the transparent appearance of the rim avoids the cluttered appearance associated with such a function with an accessory that is partially metallic and is mounted permanently on the toaster.

According to one specific form of construction of the invention, the rims are oriented toward the exterior of the toasting space, thus presenting a sufficiently large bread receiving plate or dish, assuring the stability of the bread or other food product as it rests on the rims.

Advantageously, the rims of the glass walls have bosses that present support points at different heights and assuring a passage of hot air between the rims and the food product resting thereon. The product is thus heated in a more homogeneous manner.

According to another form of construction of the invention, the rims of the glass walls are inclined to slope downwardly toward the opening of the toasting space. This slope assures an automatic centering and better stability for the products placed on the rims.

According to another form of construction of the invention, the rim of each glass wall has, on the face opposed to that receiving the food product, an electric resistance member arranged to be heated when it is connected to a current source.

This arrangement permits the lateral faces of the products to be heated locally, bringing a complementary heating to that generated in the toasting space by the heating walls. The complementary heating elements on the rims speed up reheating of products that rest on the rims.

Advantageously, the resistance member on each rim element is a layer of metal oxide or oxides assuring transparency in harmony with the main heating elements.

According to the invention, transparent covers are disposed close to the faces of the glass walls that are covered with the layers of metal oxide or oxides. These transparent covers protect the electrically active surfaces by preventing them from being contacted by users. Their transparency allows viewing of the bread that is being toasted or the product that is being reheated.

Advantageously, each substrate and its rims are made in one piece of pressed glass, fabricated in a molding operation.

This fabrication process permits, in a single molding operation, the formation of the flat substrate and of the rim, without incurring additional costs to provide for the reheating function while achieving a continuity of the wall and its rim, without requiring any separate attachment operation, such as welding, soldering or bonding between each main wall and its associated rim.

BRIEF DESCRIPTION OF DRAWING

The invention will be described in greater detail with reference to the following drawings, which simply illustrate non-limiting examples of embodiments of the invention.

DETAILED DESCRIPTION OF THE INVENTION

Figure 1:
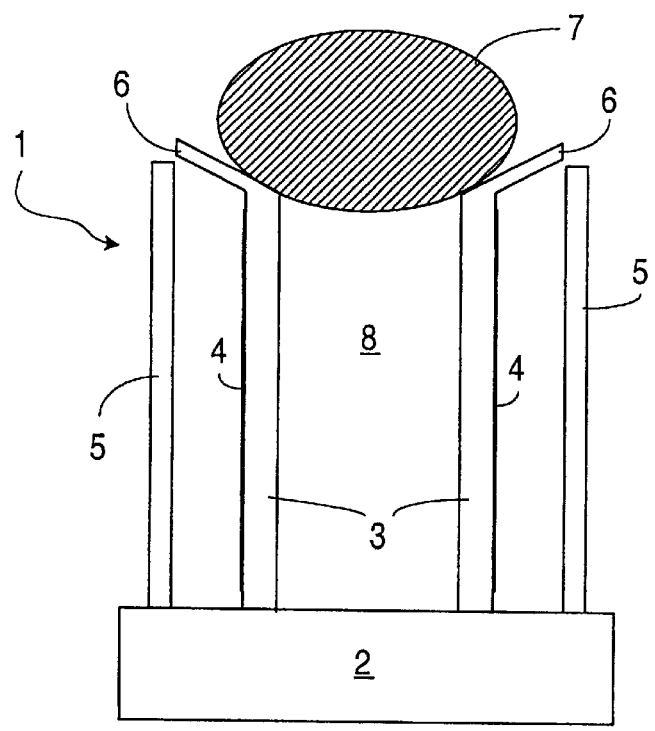
FIG. 1 is a simplified, elevational, cross-sectional view illustrating the basic components of a toaster according to one embodiment of the invention in a position for reheating rolls.

FIG. 1 shows the basic components of a toaster according to the invention. These components include two vertically oriented heating elements delimiting, or bounding, two opposed vertical sides of a cooking, or toasting, space 8. Each of these heating elements is composed of a substrate 3 made of transparent glass and a layer 4 adhered to one face of substrate 3. Layer 4 is made of an oxide of at least one metal.

According to the present invention, substrates 3 are extended, at their upper edge, by a transparent rim, or lip, 6. Rim 6 extends transversely to substrate 4, extending horizontally or being inclined relative to the horizontal. Rim 6 can be a part that is separately manufactured and then attached to substrate 3, such as a plastic piece welded or bonded to substrate 3, or may be formed in one piece with substrate 3. In this latter case the single piece would be subjected to a local deformation in order to establish the desired bend between substrate 3 and its associated rim 6.

Advantageously, each substrate 3 and its associated rim 6 is manufactured in one piece by molding, using pressed glass techniques. Such a technique permits the creation of relatively complex forms that would not be permitted by conventional flat glass production techniques.

In effect, the process of fabrication by molding corresponds to a pressing of molten or viscous glass at a temperature of around 1200° C. poured into a matrix, with a die pressing on the glass to cause it to conform to the space defined by the matrix and the die. The glass piece is then unmolded and reheated or otherwise treated to remove burrs. A thermal treatment completes the cycle in order relieve stresses and reinforce the mechanical characteristics of the piece.

It is particularly possible, by the technology described above, to simply extend the flat part of substrate 3 to form the inclined or horizontal rim 6 during a single molding operation. Then, two such parts can be arranged opposite one another to perform a reheating function by providing a type of plate, or dish, to support food products, such as rolls, to be reheated.

Figure 2:
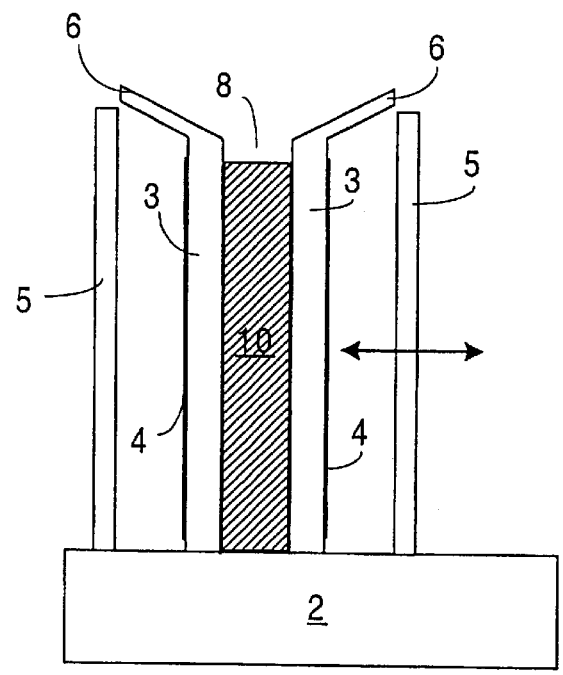
FIG. 2 is a view similar to that of FIG. 1 showing the embodiment of FIG. 1 in a position for toasting bread.

Preferably, substrates 3, or the parts thereof forming vertical walls, have a thickness between 3 and 6 mm, and each rim 6 has a width, in the direction parallel to the plane of the FIGS. 1 and 2, of the order of 10–40 mm, and a thickness of 3–10 mm.

Figure 3:
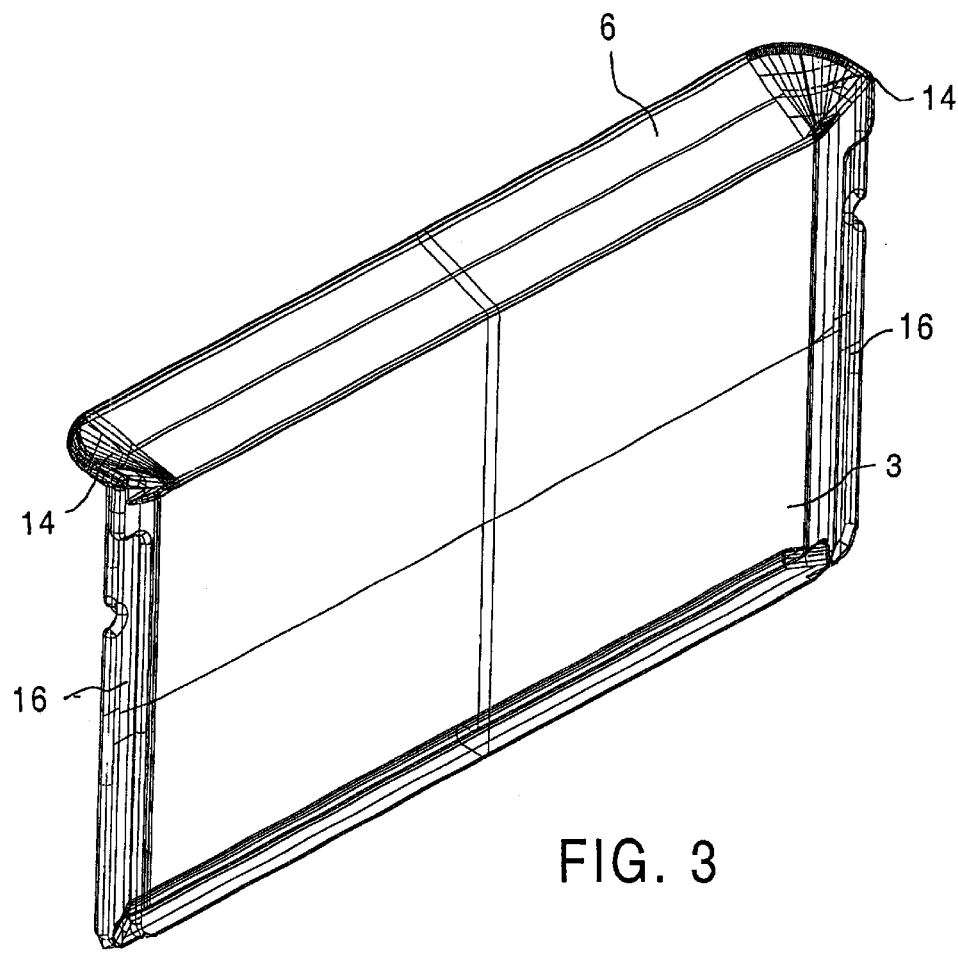
FIG. 3 is a perspective view of one component of the invention constituted by a glass substrate having a rim along its upper edge.

FIG. 3 shows one specific embodiment of a substrate 3 and associated rim 6 according to the invention in which substrate 3 has a curved portion 14 at the level of substrate edges 16, this constituting a pseudo half-crown that serves to limit sharp corners while assuring a good retention of the food products.

Each oxide layer is preferably of ITO, FTO (Fluorine Tin Oxide), or $TiO_2$, as is well know in the semiconductor field. Such layers have the advantage of remaining transparent when formed into thin layers, while having appropriate electrical resistance characteristics. They are thus particularly used in heating elements. Typically, the layers used have a resistivity of 10–100 ohms per square and a thickness of the order of 0.5 $\mu$m, these two parameters being variable and adjustable as a function of the desired power.

Figure 5E:
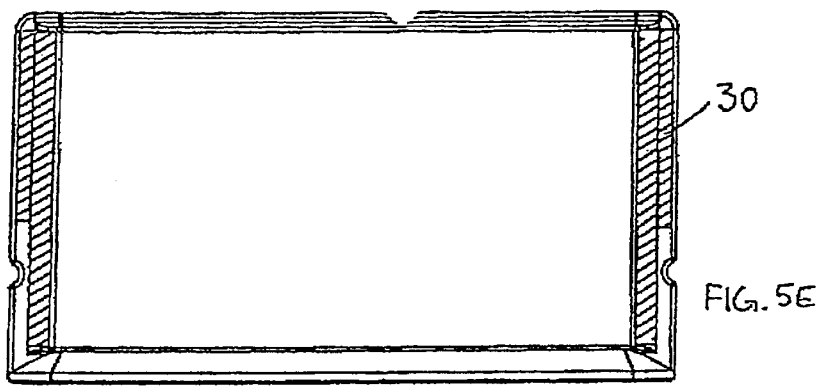
FIG. 5E is a side elevational view showing the side of the component of FIG. 5 that is not visible in FIG. 5 and showing the component in an inverted position.
Figure 5B:
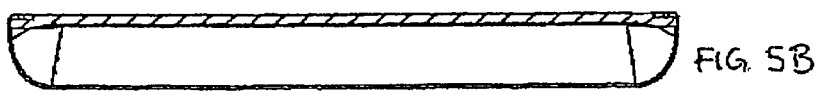
FIG. 5B is cross-sectional view along line 5B—5B of FIG. 5.
Figure 5:
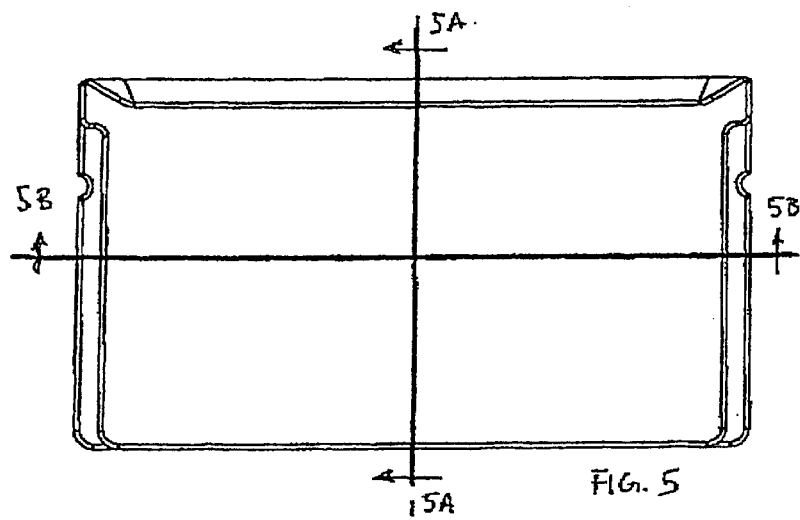
FIG. 5 is a side elevational view of the component shown in FIG. 3.
Figure 5C:
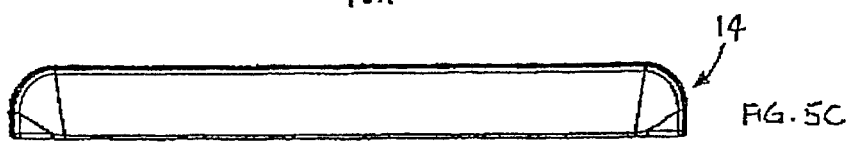
FIG. 5C is a top plan view of the component of FIG. 5.
Figure 5A:
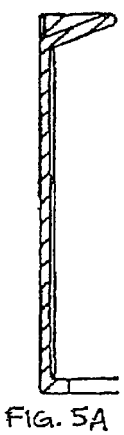
FIG. 5A is cross-sectional view along line 5A—5A of FIG. 5.
Figure 5D:
FIG. 5D is a side elevational view of the component of FIG. 5, viewed from the left-hand side of FIG. 5.
Figure 5F:
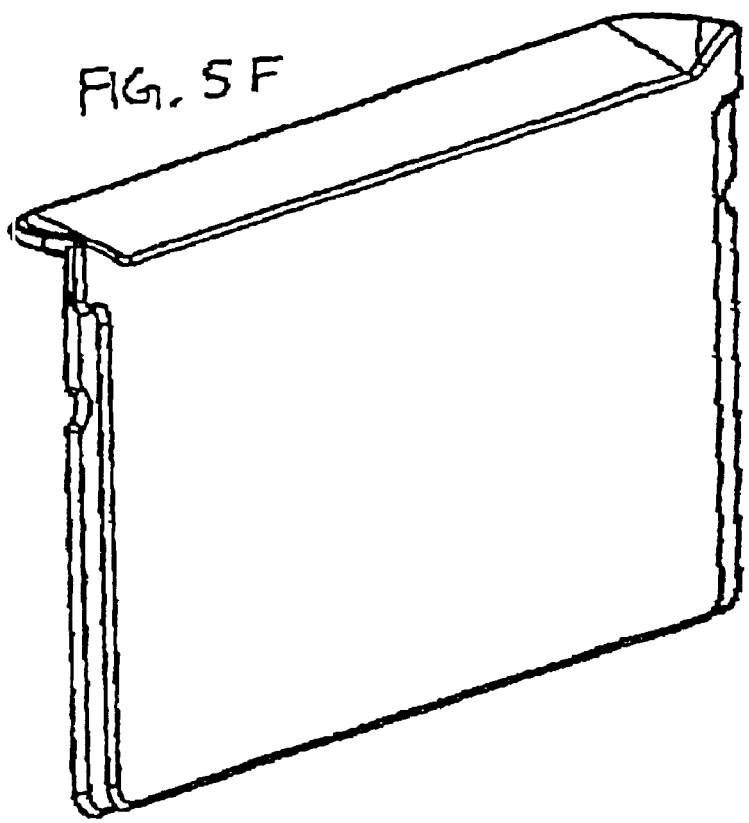
FIG. 5F is a perspective view showing the component of FIG. 5 from the same side as shown in FIG. 5.
Figure 5G:
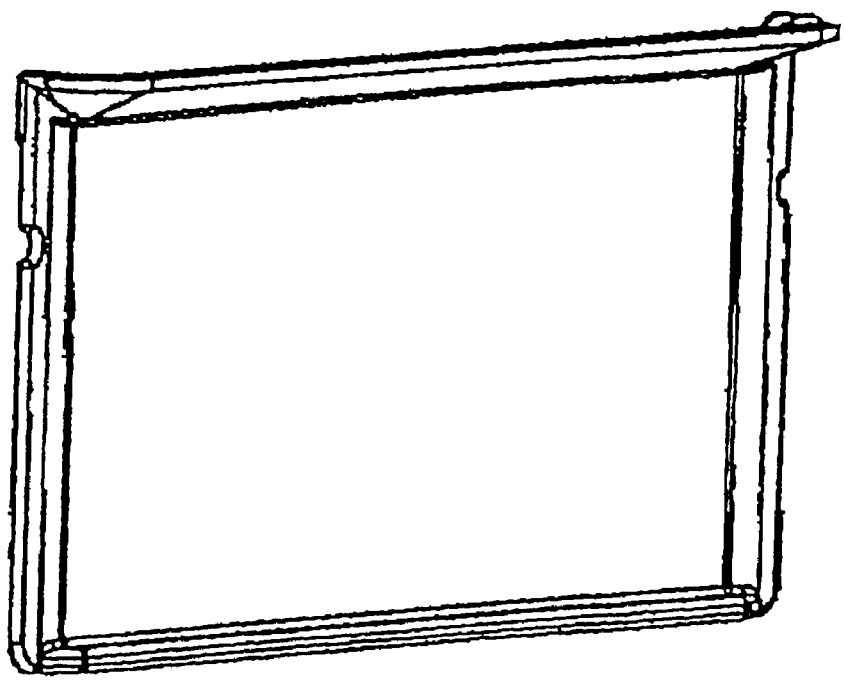
FIG. 5G is a perspective view showing the component of FIG. 5 from the side that is not visible in FIG. 5

The contacts for supplying electric power to resistive layers 4 can be made in the form of resistive bands, strips, 30 disposed along the edges 16 of each substrate. One of these strips is shown in FIG. 5E. The passage of current provokes a heating, by the Joule effect, of these layers which heat, in turn, by conduction, the glass substrates.

The layers are preferably disposed on the face of each substrate which is directed away from the toasting space 8, taking into account their possible toxicity if brought into contact with food products, but equally due to the fact that such substrates have an emissivity around 6 times weaker from the side covered with the metal oxide layer than the opposite side, as is particularly pointed out in French application 2,731,311, published on Sep. 6, 1996.

In order to satisfy the requirements relative to elements having a voltage applied thereto, and thus to protect the user from the risk of electric shocks as a result of contact with either of layers 4, while retaining the transparent feature of the toaster, transparent covers 5 are disposed in immediate proximity to these layers.

For the toasting function, various embodiments can be envisioned, either a mode purely by radiation, or a mode purely by conduction, or a quasi-conductive mode where the food item 10 to be toasted (FIG. 2) is very close to the heating elements but separated therefrom by a small distance. This last mode is described in French document 2 759 842 and allowed U.S. application Ser. No. 09/367,401.

In those embodiments that toast bread 10 solely by radiation from the heating elements, in a conventional manner, there is provided a sliding bread carriage that will bring the bread in proximity to the heating elements as well as then raising it out of the toasting space without any risk of burning. This form of construction requires a high temperature for the heating elements, around 400° C., since the bread is spaced some distance from the heating elements. In those forms of construction where bread 10 is toasted by conduction or in the quasi-conductive mode, as shown in FIGS. 1 and 2 herein, toasting space 8 can be equipped or not with a bread support carriage. In effect, for toasting in these two modes it is necessary to dispose the heating elements at a precise distance from the two faces of a slice of bread 10. This thus requires a horizontal displacement of at least one of the heating elements, for example between the position shown in FIG. 1 when a bread slice is to be introduced or withdrawn and the position shown in FIG. 2 when toasting is being carried out. The toaster may easily be constructed so that the clearance between substrates 3 in the position of FIG. 1 is sufficient for the user to withdrawal the slice of bread 10 after it has been toasted without risk of being burned by the hot heating element surfaces. A simple bread support, which need not be capable of sliding vertically, can thus offer an economical solution to the requirement for providing a suitable support for the bread that is to be toasted.

A practical embodiment of a toaster according to the invention is also equipped with a base 2 serving as a support for substrate 3, cover 5 and the mechanisms that will retain the bread. This base 2 includes a housing for the electronics So required for temperature regulation of the heating elements as well as for controlling the toasting temperature and time, and for various other controls, particularly for selecting the degree of toasting and the cooking mode, i.e. "toasting" or "reheating".

To perform the toasting function, the cycle commences with a clamping of the heating elements or substrates, 3 against one or more slices of bread, preceded or not by a descent of the bread supporting carriage if this is provided in the toaster. These two actions can be manual, effectuated by the user, or automatic, performed by one or two suitable motors. By way of example, the clamping can be effectuated by moving one or both heating elements over a path that causes a variation in distance between them of the order to 50 mm. For example, this movement can be controlled so that the spacing between h eating elements varies between 5 and 55 mm. Other values for this displacement can readily be chosen, particularly as a function of the geographic region where the toaster is marketed and the different types of bread slices encountered there. The values can also be varied as a function of whether or not a vertically sliding bread supporting carriage is provided.

At the end of a toasting cycle, the supply of current to the heating elements is terminated and at least one of the two substrates 3 is moved away from bread slice 10, permitting the user to recover the toasted bread slice, or slices, possible lifted by the sliding bread supporting carriage, if this is provided.

In the case of the reheating function, food products, such as one or more rolls 7, are placed on rims 6 so that the lower surfaces of rolls 7 are located above toasting space 8. In an embodiment in which one or both heating elements are movable horizontally, they are maintained spaced apart for the reheating function thereby allowing free circulation of air beneath rolls 7 and a better distribution of heated air along their surfaces. In effect, the heat energy necessary for reheating is transferred by convection. Air is heated by contact with plates 3, whose temperature is adjusted to be within the vicinity of 230° C., for example, then rises by natural convection in order to heat the lower surfaces of rolls 7, or other food items.

Preferably, for the reheating function, substrates 3 are spaced from one another by a distance that allows a good distribution of heat without unduly reducing the heat energy density supplied to items 7, while assuring that the two rims 6 are sufficiently close together to securely receive a large variety of products to be reheated.

A control button (not shown) on base 2 of the toaster permits the user to select the "reheating" mode, which actuates the control of the movement of substrates 3 away from one another if such movement is provided for. According to a preferred form of construction of the invention, the heating elements are not displaced in the "reheating" mode. The mechanism controlled by such a button can be constructed according principles well known in the art.

Operation of the control button also triggers a heating cycle, which can be achieved by lowering of the bread carrying carriage when such a carriage is present, as is conventional with toasters. It can be achieved advantageously with the aid of a toasting time control button, thus reducing the number of interfaces offered to the user.

According to another variation of the invention, the cycle time is fixed, independently of the position of the button for regulating the degree of toasting.

According to another form of construction of the invention, provision can be made to reduce the heating power when the toaster is to be used to reheat rolls or similar food items. For this purpose, several technical solutions are possible. For example, a voltage divider bridge can be employed to reduce the supply voltage to the heating elements, or circuitry can be provided to supply the heating current in a periodic manner, i.e. in the form of successive pulses spaced apart by time intervals during which no current is being supplied.

At the end of a heating period, the supply of current to the heating elements is halted. If the two substrates 3 have been brought together for this operation, they are then moved away from one another.

Figure 4:
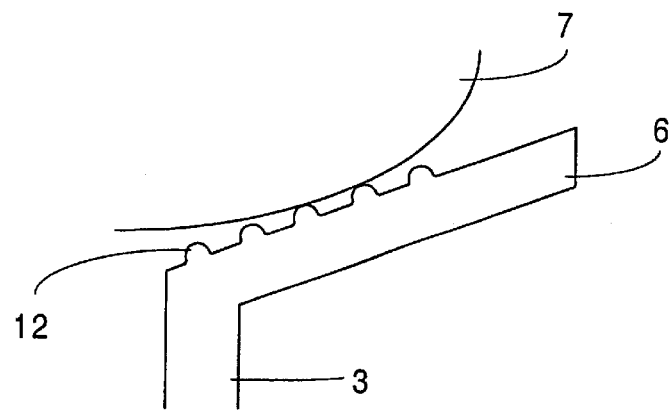
FIG. 4 is a detail view showing one form of construction of a rim according to the invention.

Advantageously, each rim 6 need not be perfectly planar, and can be provided with a plurality of bosses 12 extending across their upper surfaces, as shown in FIG. 4. Other irregular surface configurations can be envisioned without departing from the framework of the present invention, the principle being to provide zones to support a food item, such as a roll 7, while permitting a flow of warm air between the lower surface of the food item and the upper surface of rim 6.

According to another form of construction of the invention, rims 6 have their own heating means 20 or heating means associated with the main heating means. Heating means 20, situated on the lower surface of each rim 6, or the surface opposed to that provide to support a food item, can be in the form of serpentine resistive paths. Advantageously, each heating means 20 is constituted by a layer of metal oxide or oxides having characteristics selected according to the power level desired, as explained earlier herein.

In the two cases, the heating means will permit visual observation of the food item being heated on rims 6.

This heating means will be turned on when the "reheating" function is selected, in order to operate in complement with the main reheating generated by the main heating elements 4. Heating means 20 will generally be constructed and operated to produce a level of heat lower than that produced by each of the resistive layers 4.

The addition of heating means 20 allows the time necessary for reheating food items, such as rolls, to be reduced by a considerable amount.

This application relates to subject matter disclosed in French Application Number 00 02058, filed on Feb. 18, 2000, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A toaster having an upper extremity and comprising a base and at least two substantially vertical heating elements defining a toasting space that is open at least at the upper extremity of the toaster, each of said heating elements comprising a transparent glass wall composed of a glass substrate having two opposed faces, and a metal oxide layer covering one of the faces of said substrate, said layer being connectable to an electric supply circuit for supplying heating current, wherein each of said glass walls has an upper edge provided with a rim made of a transparent material and oriented to provide a support surface for a food product to be heated.

2. The toaster according to claim 1 wherein each of said rims extends away from the toasting space.

3. The toaster according to claim 2 wherein each of said rims has an upper surface provided with bosses providing points of support for the food product to be heated.

4. The toaster according to claim 3 wherein each of said rims has an upper surface that slopes downwardly toward the toasting space.

5. The toaster according to claim 4 wherein each of said rims has a lower surface and said toaster further comprises auxiliary heating means carried by the lower surface of each of said rims.

6. The toaster according to claim 5 wherein said auxiliary heating means comprises a metal oxide layer on the lower surface of each of said rims.

7. The toaster according to claim 6 further comprising transparent covers disposed in proximity to the surfaces of said substrates that are covered with the metal oxide layers.

8. The toaster according to claim 7 wherein each of said substrates and its associated upper rim is made of a single piece of pressed glass.

9. The toaster according to claim 1 wherein each of said rims has an upper surface that slopes downwardly toward the toasting space.

10. The toaster according to claim 1 wherein each of said rims has a lower surface and said toaster further comprises auxiliary heating means carried by the lower surface of each of said rims.

11. The toaster according to claim 10 wherein said auxiliary heating means comprises a metal oxide layer on the lower surface of each of said rims.

12. The toaster according to claim 1 further comprising transparent covers disposed in proximity to the surfaces of said substrates that are covered with the metal oxide layers.

13. The toaster according to claim 1 wherein each of said substrates and its associated upper rim is made of a single piece of pressed glass.

* * * * *